US008288923B2

(12) United States Patent
Vaidyanathan

(10) Patent No.: US 8,288,923 B2
(45) Date of Patent: Oct. 16, 2012

(54) PIEZOELECTRIC BASED ENERGY SUPPLY USING INDEPENDENT PIEZOELECTRIC COMPONENTS

(75) Inventor: Raman Vaidyanathan, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 12/557,122

(22) Filed: Sep. 10, 2009

(65) Prior Publication Data

US 2011/0057546 A1  Mar. 10, 2011

(51) Int. Cl.
*H01L 41/113* (2006.01)
(52) U.S. Cl. .................. 310/339; 345/168; 345/169
(58) Field of Classification Search .......... 310/339; 345/168–169
See application file for complete search history.

(56) References Cited

U.S. PATENT DOCUMENTS

| | | | |
|---|---|---|---|
| H372 H | 11/1987 | Campbell | |
| 4,878,057 A * | 10/1989 | Kompanek et al. | 341/34 |
| 5,751,091 A | 5/1998 | Takahashi et al. | |
| 5,917,437 A * | 6/1999 | Ojala et al. | 341/34 |
| 6,407,484 B1 | 6/2002 | Oliver et al. | |
| 6,700,508 B1 * | 3/2004 | Nomura et al. | 341/27 |
| 6,879,809 B1 | 4/2005 | Vega et al. | |
| 7,154,211 B2 * | 12/2006 | Chou | 310/345 |
| 7,504,763 B2 * | 3/2009 | Haswell et al. | 310/339 |
| 2004/0085002 A1 * | 5/2004 | Pearce | 310/339 |
| 2006/0186706 A1 * | 8/2006 | Browne et al. | 296/203.01 |
| 2007/0063621 A1 * | 3/2007 | Haswell et al. | 310/339 |
| 2008/0001577 A1 | 1/2008 | Sather | |
| 2010/0253632 A1 * | 10/2010 | Chen et al. | 345/169 |

FOREIGN PATENT DOCUMENTS

| | | | |
|---|---|---|---|
| JP | 2001154783 A | * | 6/2001 |
| JP | 2005184960 A | * | 7/2005 |
| WO | WO 2009011605 A2 | * | 1/2009 |

OTHER PUBLICATIONS

Paradiso, J., et al., "Energy Scavenging for Mobile and Wireless Electronics," Pervasive Computing, Published by IEEE CS and IEEE ComSoc; #1536-1268/05; 2005 IEEE.
Sodano, H.A., et al., "Estimation of Electric Charge Output for Piezoelectric Energy Harvesting," Strain (2004) 40, pp. 49-58; 2004 Blackwell Publishing Ltd.
Lefeuvre, E., et al., "Piezoelectric Energy Harvesting Device Optimization by Synchronous Electric Charge Extraction," Journel of Intelligent Material Systems and Structures, vol. 16, No. 10, 865-876 (2005) DOI: 10.1177/104538905056859; Copyright 2005 by SAGE Publications.
Gamota, D., et al., "PowerLink System for Portable Products," IP.com No. IPCOM000004832D; Published Jun. 27, 2001; Copyright IP.com, Inc.

* cited by examiner

*Primary Examiner* — Jaydi San Martin
(74) *Attorney, Agent, or Firm* — Jeffrey N. Giunta; Fleit Gibbons Gutman Bongini & Bianco PL

(57) ABSTRACT

A piezoelectric based energy supply includes a multiplicity of mechanical actuators able to be displaced through operation by an operator from a first position and a second position. A multiplicity of independent piezoelectric components is disposed below the multiplicity of actuators. Each independent piezoelectric component within the multiplicity of independent piezoelectric components is associated with at least one respective actuator in the multiplicity of actuators and is adapted to be deformed by displacement of the at least one respective actuator within the plurality of actuators from a first position and a second position. An electrical coupler electrically couples each of the multiplicity of independent piezoelectric components.

17 Claims, 3 Drawing Sheets

PIEZOELECTRIC BASED ENERGY SUPPLY USING INDEPENDENT PIEZOELECTRIC COMPONENTS

FIELD OF THE INVENTION

The present invention generally relates to the field of energy supplies, and more particularly relates to energy supplies incorporating piezoelectric components.

BACKGROUND OF THE INVENTION

Energy supplies such as rechargeable batteries are in many instances the Achilles heel of electronic devices. Many current energy supplies have a limited lifespan or cannot provide sufficient power for long durations of time. Most conventional energy supplies also require an external energy source to recharge. Therefore, the electronic device is unusable if the energy supply is depleted and an external energy source such as a power outlet is unavailable to recharge the energy supply.

SUMMARY OF THE INVENTION

In one embodiment, a piezoelectric based energy supply is disclosed. The piezoelectric based energy supply comprises a plurality of mechanical actuators able to be displaced through operation by an operator from a first position and a second position. A plurality of independent piezoelectric components is disposed below the plurality of actuators. Each independent piezoelectric component within the plurality of independent piezoelectric components is associated with at least one respective actuator in the plurality of actuators and adapted to be deformed by displacement of the at least one respective actuator within the plurality of actuators from a first position and a second position. An electrical coupler electrically couples each of the plurality of independent piezoelectric components.

In another embodiment, a method of piezoelectric energy generation is disclosed. The method comprises providing a plurality of mechanical actuators able to be displaced through operation by an operator from a first position and a second position. A plurality of independent piezoelectric components disposed below the plurality of actuators is provided. Each independent piezoelectric component within the plurality of independent piezoelectric components being associated with at least one respective actuator in the plurality of actuators and adapted to be deformed by displacement of the at least one respective actuator within the plurality of actuators from a first position and a second position. An electrical coupler that electrically couples each of the plurality of independent piezoelectric components is provided. At least one actuator is displaced so as to deform a respective independent piezoelectric component associated with the at least one actuator.

In yet another embodiment, a piezoelectric based energy supply is disclosed. The a piezoelectric based energy supply comprises a plurality of mechanical actuators that re able to be displaced through operation by an operator from a first position and a second position. A first plurality of independent piezoelectric components is disposed below the plurality of actuators. A second plurality of independent piezoelectric components is disposed below the first plurality of independent piezoelectric components. Each independent piezoelectric component within the first plurality of independent piezoelectric components is associated with at least one respective actuator in the plurality of actuators. Each independent piezoelectric component within the first plurality of independent piezoelectric components is adapted to be deformed by displacement of the at least one respective actuator within the plurality of actuators from a first position and a second position.

Each independent piezoelectric component within the second plurality of independent piezoelectric components is associated with at least one respective piezoelectric component in the first plurality of independent piezoelectric components. Each independent piezoelectric component within the second plurality of independent piezoelectric components is adapted to be deformed by the at least one respective piezoelectric when the at least one respective piezoelectric is deformed by displacement of the at least one respective actuator within the plurality of actuators from a first position and a second position. A first electrical coupler electrically couples each of the plurality of independent piezoelectric components. A second electrical coupler electrically couples each of the plurality of independent piezoelectric components to each other and to the first plurality of piezoelectric components.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. Additionally, the invention shall have the full scope of the claims and shall not be limited by the embodiments shown below.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. It is further understood that the use of relational terms, if any, such as first, second, top and bottom, front and rear, and the like are used solely for distinguishing one entity or action from another, without necessarily requiring or implying any such actual relationship or order between such entities or actions.

Figure 1:
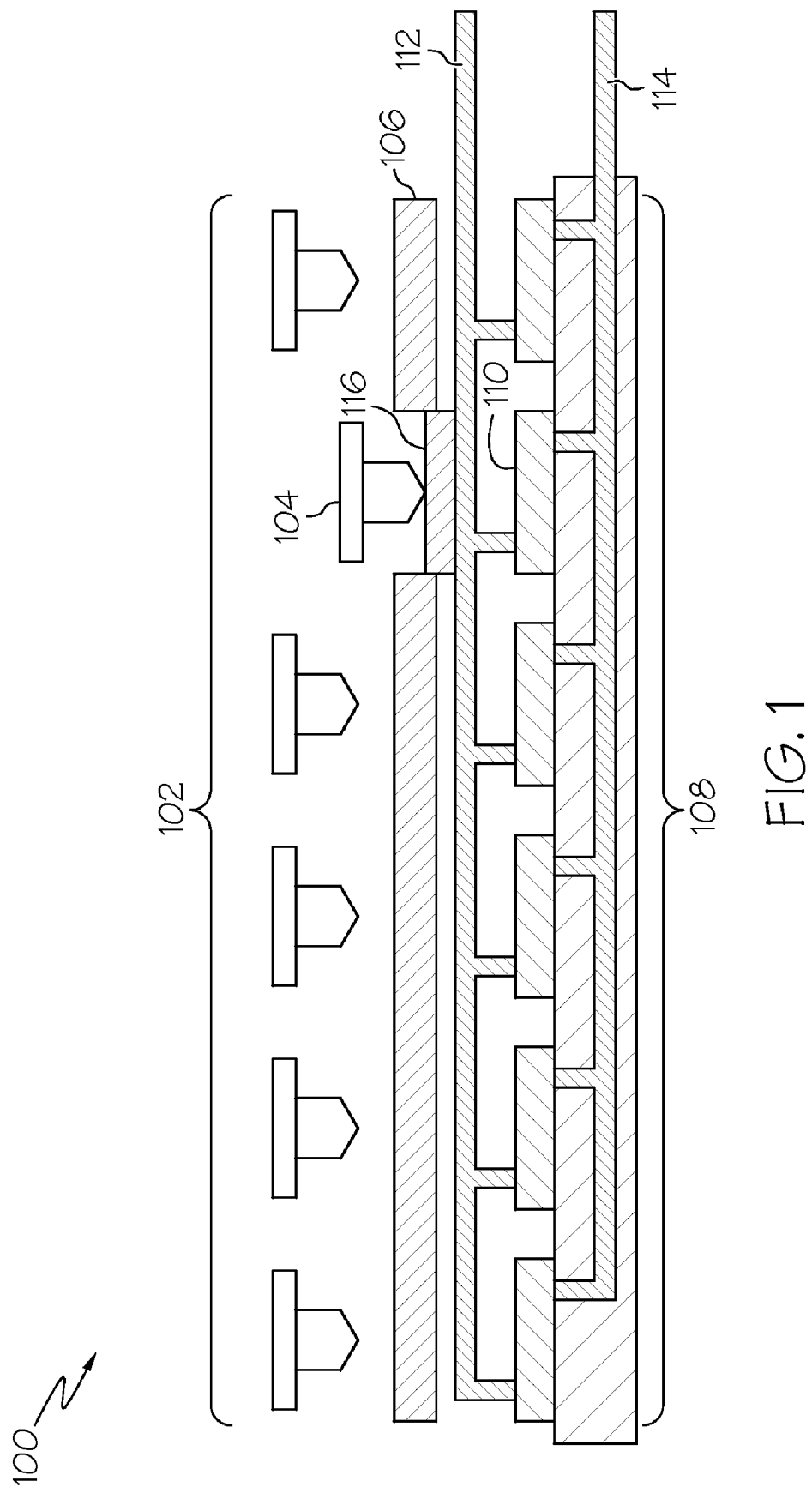
FIG. 1 is a side cross-sectional view of a piezoelectric based energy supply according to one embodiment of the present invention.

According to one embodiment of the present invention a planar view of an electronic circuit 100 comprising a piezoelectric based energy supply is shown in FIG. 1. As discussed above, traditional energy supplies such as rechargeable batteries require an external energy source such as a power outlet to recharge. The various embodiments of the present invention, on the other hand, implement piezoelectric components that generate energy in response to, for example, a user's mechanical interactions with the piezoelectric components. The various embodiments of the present invention provide a charging system that can be embedded within electronic devices or that can be used to create a mobile charging station (which can be used as a standalone product or be integrated within a device).

In particular, FIG. 1 shows a plurality 102 of actuators 104 such as keys on a keyboard disposed above an actuator responsive circuit 106 such as a keypad circuit. FIG. 1 also shows a plurality 108 of piezoelectric components 110. The piezoelectric components 110 comprise one or more piezoelectric materials such as piezoelectric crystals, piezoelectric ceramics, piezoelectric polymers, and the like. In one embodiment, an actuator responsive circuit provides an output indicating an operator's selection or pressing of an actuator 104.

Each piezoelectric component 110 within the plurality of piezoelectric components 108 includes one or more contacts 112, 114. In one embodiment, each piezoelectric component 110 acts independent of any other piezoelectric component within the plurality of piezoelectric components 108. Many or all of the piezoelectric components 110 of one embodiment of the present invention are electrically coupled in parallel via their contacts 112, 114. By electrically coupling several piezoelectric components in parallel, each piezoelectric component 110 is able to produce energy in response to deformation without being affected by failures of another piezoelectric component within the plurality of piezoelectric components 110. The independent structure of the plurality of piezoelectric components 108 being wired in parallel, as opposed to in a serial connection, allows for a constant generation of electricity regardless of malfunction of any single piezoelectric component in the system.

In addition to the structure illustrated in FIG. 1, further embodiments of the present invention are able to be implemented by placing a piezoelectric components beneath, for example, a touch screen wherein the piezoelectric components are deformed by a user's pressing of the touchscreen surface. Further embodiments are further able to operate with a pen to write in a touch screen to depress a screen surface and thereby deform the piezoelectric components. Embodiments of the present invention are able to be incorporated into, for example, a mouse or other pointing device wherein one of a plurality of piezoelectric components is deformed by the pressing of a mouse button or other user input button.

As illustrated in FIG. 1, each actuator 104 or actuation area such as, for example, an area of a touch screen, can be associated with one or more piezoelectric components. In other words, one embodiment of the present invention have one or more independent piezoelectric components corresponding to an actuator/actuation area as compared to a single piezoelectric layer corresponding to all the actuators/actuation areas. Although keyboard keys are illustrated in FIG. 1, it should be noted that a wide variety of component designs are able to be used as an actuator 104. Any component that is capable of transferring pressure from an operator's pressing a surface to a responsive circuit 106 and/or a piezoelectric component 110 is able to be incorporated into the present invention. For example, pointing devices, touch screens, a stylus/pen, touchpad, and the like and their responsive circuits 106 are also able to incorporate various embodiments of the present invention.

In the example illustrated in FIG. 1, the piezoelectric components 110 are disposed under the actuator responsive circuit 106. However, as is discussed in greater detail below, the various embodiments of the present invention are able to have piezoelectric components 110 located in a variety of locations. As the actuators 104 are displaced from a first position to a second position by, for example, an operator pressing the actuator 104, the actuators 104 substantially contact the actuator responsive circuit 106 causing a portion 116 of the responsive circuit 106 of that embodiment to be displaced, as shown in FIG. 1. This displacement causes pressure to be exerted on the piezoelectric component 110. This mechanical stress experienced by the piezoelectric component 110 causes the piezoelectric component 110 to generate an electric potential. The generated electric charge is then conducted across the contacts 112, 114 to various components requiring power or the generated electrical charge can be stored. Examples of components to which the contacts 112, 114 can be electrically coupled include: a battery in order to charge the battery; a removable charge storage device that can be removed from the electronic device and used to power other electronic devices; or other components such as a display, processor, etc., that require energy.

As discussed above, one or more piezoelectric components 110 can be independent of one or more other piezoelectric components. This allows for a more robust piezoelectric based energy supply. For example, if a single actuator 104 fails/breaks and the corresponding piezoelectric component is coupled to the actuator, only the single actuator and the corresponding piezoelectric component need to be removed. This is compared to a configuration that requires the removal of all the keys and the entire piezoelectric substrate (e.g., the plurality of piezoelectric components 108) when a single actuator 104 fails/breaks. Similarly, with the various embodiments of the present invention, if a single piezoelectric component 104 fails only that particular component 104 is required to be replaced as compared to the entire piezoelectric substrate.

Figure 2:
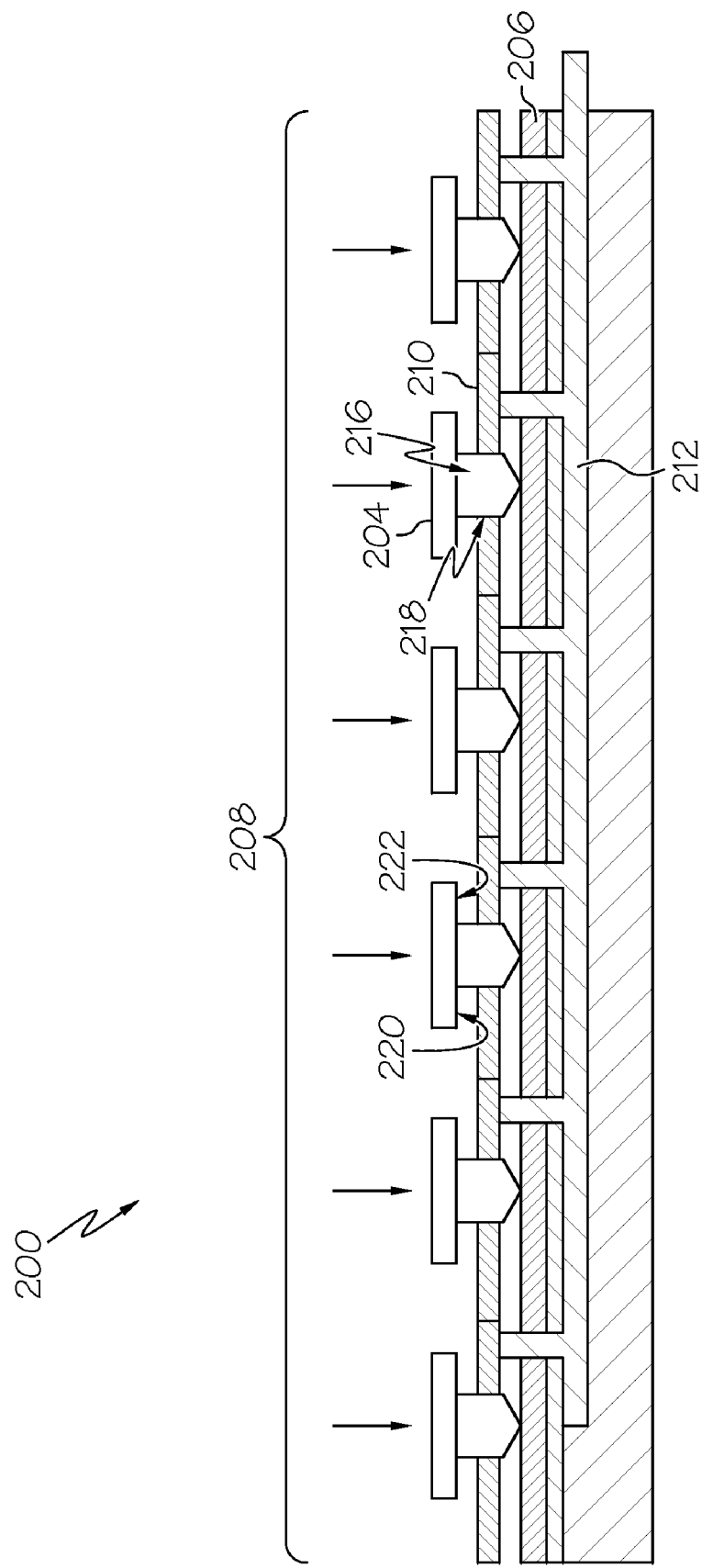
FIG. 2 is a side cross-sectional view of another piezoelectric based energy supply according to one embodiment of the present invention.

FIG. 2 shows another embodiment of a piezoelectric system 200. In particular, FIG. 2 shows a plurality 208 of piezoelectric components 210 disposed above an actuator responsive circuit 206. Similar to the embodiment discussed above with respect to FIG. 1 one or more of the piezoelectric component 210 in the plurality of piezoelectric components 208 are independent of one or more of the other piezoelectric components, which provides the advantages discussed above. FIG. 2 also shows that each of the piezoelectric components 210 is electrically coupled in parallel with the other piezoelectric components within the plurality 208 of piezoelectric components via one or more contacts 212.

Each piezoelectric component 210 of one embodiment comprises a via 218 that allows at least a portion 216 of a corresponding actuator 204 to pass through that corresponding piezoelectric component 210 and substantially contact the actuator responsive circuit 206. In one embodiment, an actuator 204 passing through the via 218 is, for example, mechanically attached to the wall of the via so as to be able to transfer movement of the actuator, such as by a keypress, to the via and thereby deform the corresponding piezoelectric component 210.

As a force (e.g., mechanical stress) is exerted on the actuator 210 to cause at least the portion 216 of the actuator that passes through the via to deform the piezoelectric component 210, either the portion 216 or one or more portions 220, 222 of the actuator 204 exert a mechanical stress on the corresponding piezoelectric component 210. As discussed above, this mechanical stress experienced by the piezoelectric component 210 causes the piezoelectric component 210 to generate an electric potential. The electric charge is then conducted across the contacts 212 and is delivered to various components using or storing that power.

Figure 3:
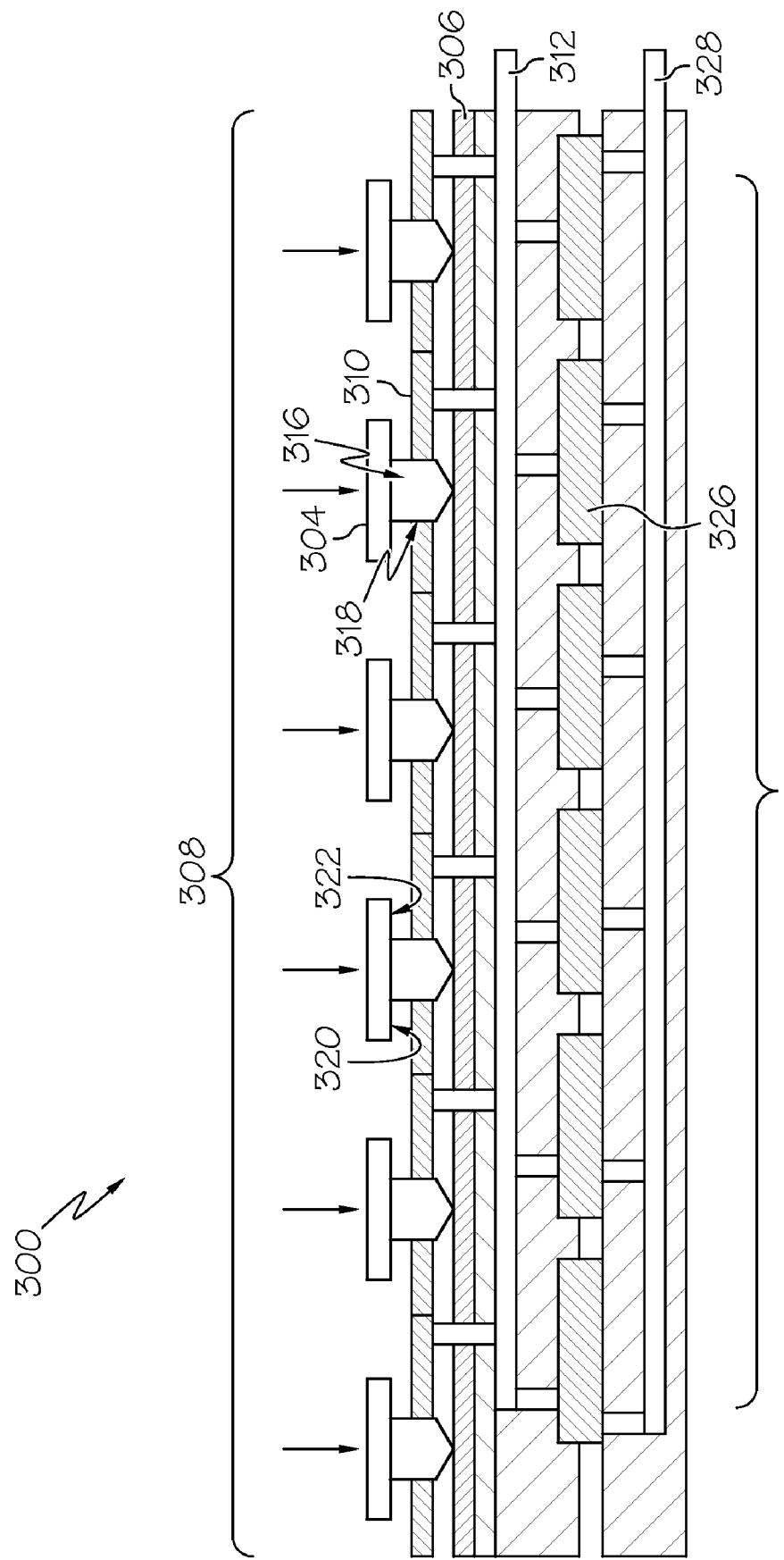
FIG. 3 is a side cross-sectional view of yet another piezoelectric based energy supply according to one embodiment of the present invention.

FIG. 3 shows yet another embodiment of a piezoelectric system 300. In particular, FIG. 3 shows a first plurality 308 of piezoelectric components 310 disposed above an actuator responsive circuit 306 and a second plurality 324 of piezoelectric components 326 disposed below the actuator responsive circuit 306. In one embodiment, the each piezoelectric component 310 in the first plurality 308 comprises a via 318 similar to that discussed above with respect to FIG. 2, whereas the second plurality 324 of piezoelectric components 324 can be configured as a film system (e.g., no vias) similar to the system discussed above with respect to FIG. 1. It should be noted that although only two layers of piezoelectric components are shown in FIG. 3 any number of piezoelectric component layers with any configurations such as a via configuration or a film configuration are applicable to the various embodiments of the present invention.

Similar to the embodiments discussed above with respect to FIGS. 1 and 2 one or more of the piezoelectric components 310, 326 in the first and second pluralities of piezoelectric components 308, 324 are independent of one or more of the other piezoelectric components, which provides the advantages discussed above. FIG. 3 also shows that each of the piezoelectric components 308, 326 is electrically coupled in parallel with the other piezoelectric components via one or more contacts 312, 328. In one embodiment, the contacts 312 of the first plurality 308 of piezoelectric components 310 are electrically coupled to the second plurality 324 of piezoelectric components 326. As discussed above, the contacts 312, 328 can be coupled to an energy supply such as a rechargeable battery or a removable energy supply that be charged using the piezoelectric system 300 and used to provide power to one or more other electronic devices.

The vias 318 of the piezoelectric components 310 of the first plurality allow at least a portion 316 of a corresponding actuator 304 to pass through its corresponding piezoelectric component 310 and substantially contact the actuator responsive circuit 306. The actuator 304 of one embodiment is mechanically attached to the via 318. As a force (e.g., mechanical stress) is exerted on the actuator 310 to cause at least the portion 316 of the actuator 304 to deform the piezoelectric components 310 by moving the via 318, this portion 316 (or one or more other portions 320, 322) of the actuator 304 exerts a mechanical stress on the corresponding piezoelectric component 310. As discussed above, this mechanical stress experienced by the piezoelectric component 310 causes the piezoelectric component 310 to generate an electric potential. The electric charge is then conducted across the contacts 312 to various components using or storing power.

In addition, the mechanical stress exerted by the actuators 304 generates a stress at the second plurality 324 of piezoelectric components 326. This stress experienced by the piezoelectric components 326 of the second plurality 324 causes the piezoelectric components 326 to also generate an electric potential. The electric charge is then conducted across the contacts 328 to various components requiring power or can be stored. Therefore, the piezoelectric system 300 of FIG. 3 is able to generate a larger quantity of energy than the systems of FIGS. 1 and 2.

As can be seen from the discussion above, the various embodiments of the present invention provide piezoelectric systems that are able to generate energy from mechanical stress that is induced by, for example, a person's operation of a keyboard or other input device. The piezoelectric components of one embodiment of the present invention are independent of each other, and therefore, can be replaced individually as compared to having to replace the entire piezoelectric array. The piezoelectric systems discussed above can be integrated into a larger system or product, or they can be implemented as a unique product.

It should be understood that the above described embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described above is used in the fabrication of integrated circuit chips. The resulting integrated circuit chips can be distributed by the fabricator in raw wafer form (that is, as a single wafer that has multiple unpackaged chips), as a bare chip, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard, or other input device, and a central processor.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:
1. A piezoelectric based energy supply comprising:
   a plurality of mechanical actuators able to be displaced through operation by an operator from a first position and a second position;

a plurality of independent piezoelectric components disposed below the plurality of actuators, each independent piezoelectric component within the plurality of independent piezoelectric components being associated with at least one respective actuator in the plurality of actuators and adapted to be deformed by displacement of the at least one respective actuator within the plurality of actuators from a first position and a second position, wherein at least one independent piezoelectric component within the plurality of independent piezoelectric components comprises a via; and an electrical coupler electrically coupling each of the plurality of independent piezoelectric components.

2. The piezoelectric based energy supply of claim 1, further comprising:

at least one rechargeable energy supply electrically coupled to the electrical coupler.

3. The piezoelectric based energy supply of claim 1, further comprising:

a plurality of contacts conductively connected to each independent piezoelectric component within the plurality of piezoelectric components, the plurality of contacts adapted to conduct an electric potential generated in response to mechanical stress upon at least one independent piezoelectric component.

4. The piezoelectric based energy supply of claim 1, wherein each of the plurality of independent piezoelectric components are electrically coupled in parallel.

5. The piezoelectric based energy supply of claim 1, further comprising:

an actuator responsive circuit disposed below the plurality of actuators and above the plurality of independent piezoelectric components.

6. The piezoelectric based energy supply of claim 1, wherein the via is disposed in proximity to a portion of an associated actuator within the plurality of mechanical actuators and displacement of the associated actuator from a first position to a second position exerts mechanical stress on the at least one independent piezoelectric component.

7. A method of piezoelectric energy generation, the method comprising:

providing a plurality of mechanical actuators able to be displaced through operation by an operator from a first position and a second position;

providing a plurality of independent piezoelectric components disposed below the plurality of actuators, each independent piezoelectric component within the plurality of independent piezoelectric components being associated with at least one respective actuator in the plurality of actuators and adapted to be deformed by displacement of the at least one respective actuator within the plurality of actuators from a first position and a second position, wherein at least one independent piezoelectric component within the plurality of independent piezoelectric components comprises a via;

providing an electrical coupler electrically coupling each of the plurality of independent piezoelectric components, and displacing at least one actuator so as to deform a respective independent piezoelectric component associated with the at least one actuator.

8. The method of claim 7, further comprising:

providing at least one rechargeable energy supply electrically coupled to the electrical coupler, the at least one rechargeable.

9. The method of claim 7, further comprising:

providing a plurality of contacts conductively connected to each independent piezoelectric component within the plurality of piezoelectric components, the plurality of contacts adapted to conduct an electric potential generated in response to mechanical stress upon at least one independent piezoelectric component.

10. The method of claim 7, wherein each of the plurality of independent piezoelectric components are electrically coupled in parallel.

11. The method of claim 7, further comprising:

providing an actuator responsive circuit disposed below the plurality of actuators and above the plurality of independent piezoelectric components.

12. The method of claim 7, wherein the via is disposed in proximity to a portion of an associated actuator within the plurality of mechanical actuators and displacement of the associated actuator from a first position to a second position exerts mechanical stress on the at least one independent piezoelectric component.

13. A piezoelectric based energy supply comprising:

a plurality of mechanical actuators able to be displaced through operation by an operator from a first position and a second position;

a first plurality of independent piezoelectric components disposed below the plurality of actuators, wherein at least one independent piezoelectric component within the first plurality of independent piezoelectric components comprises a via;

a second plurality of independent piezoelectric components disposed below the first plurality of independent piezoelectric components, wherein each independent piezoelectric component within the first plurality of independent piezoelectric components is associated with at least one respective actuator in the plurality of actuators and adapted to be deformed by displacement of the at least one respective actuator within the plurality of actuators from a first position and a second position, and wherein each independent piezoelectric component within the second plurality of independent piezoelectric components is associated with at least one respective piezoelectric component in the first plurality of independent piezoelectric components and adapted to be deformed by the at least one respective piezoelectric when the at least one respective piezoelectric is deformed by displacement of the at least one respective actuator within the plurality of actuators from a first position and a second position;

a first electrical coupler electrically coupling each of the plurality of independent piezoelectric components; and a second electrical coupler electrically coupling each of the plurality of independent piezoelectric components to each other and to the first plurality of piezoelectric components.

14. The piezoelectric based energy supply of claim 13, further comprising:

at least one rechargeable energy supply electrically coupled to at least one of the first electrical coupler and the second electrical coupler.

15. The piezoelectric based energy supply of claim 13, further comprising:

a first plurality of contacts conductively connected to each independent piezoelectric component within the first plurality of piezoelectric components and a second plurality of contacts conductively connected to each independent piezoelectric component within the second plurality of piezoelectric components, the first plurality of contacts and the second plurality of contacts adapted to conduct an electric potential generated in response to mechanical stress upon at least one independent piezoelectric component.

16. The piezoelectric based energy supply of claim 13, wherein each of the first plurality of independent piezoelectric components and the second plurality of independent piezoelectric components are electrically coupled in parallel.

17. The piezoelectric based energy supply of claim 13, wherein the via is disposed in proximity to a portion of an associated actuator within the plurality of mechanical actuators and displacement of the associated actuator from a first position to a second position exerts mechanical stress on the at least one independent piezoelectric component.

* * * * *